(12) United States Patent
Anderson

(10) Patent No.: US 8,839,469 B1
(45) Date of Patent: Sep. 23, 2014

(54) BUNK BED FRAME LOCKING SYSTEM

(71) Applicant: David S Anderson, Louisville, KY (US)

(72) Inventor: David S Anderson, Louisville, KY (US)

(73) Assignee: Anderson Wood Products Company, Louisville, KY (US)

( * ) Notice: Subject to any disclaimer, the term of this patent is extended or adjusted under 35 U.S.C. 154(b) by 0 days.

(21) Appl. No.: 13/986,033

(22) Filed: Mar. 25, 2013

Related U.S. Application Data

(60) Provisional application No. 61/851,264, filed on Mar. 4, 2013.

(51) Int. Cl.
*A47C 19/00* (2006.01)
*A47C 19/02* (2006.01)
*A47C 19/20* (2006.01)

(52) U.S. Cl.
CPC ............... *A47C 19/20* (2013.01); *A47C 19/022* (2013.01); *A47C 19/024* (2013.01); *A47C 19/025* (2013.01)
USPC .................... 5/9.1; 5/8; 5/53.1; 5/288; 5/292; 5/296

(58) Field of Classification Search
CPC .. A47C 19/005; A47C 19/021; A47C 19/022; A47C 19/024; A47C 19/025; A47C 19/20; F16B 17/00; F16B 12/44
USPC ............ 5/9.1, 2.1, 8, 53.1, 200.1, 201, 282.1, 5/285, 286, 288, 292, 296, 298, 299, 5/620; 403/315, 316, 333, 345, 353, 376
See application file for complete search history.

(56) References Cited

U.S. PATENT DOCUMENTS

| | | | |
|---|---|---|---|
| 7,107 A | 2/1850 | Ramsey | |
| 110,632 A | 1/1871 | Comins | |
| 427,645 A | 5/1890 | Watson | |
| 581,485 A | 4/1897 | Merritt | |
| 1,826,420 A | 10/1931 | Butkus | |
| 1,851,282 A | 3/1932 | Jacobs | |
| 2,238,226 A * | 4/1941 | Lindgren | 403/172 |
| 2,854,675 A | 10/1958 | Hensel | |
| 3,822,423 A | 7/1974 | Watts | |
| 4,019,298 A | 4/1977 | Johnson | |
| 4,064,996 A | 12/1977 | Shillum | |
| 4,148,106 A | 4/1979 | Gallien | |
| 4,312,086 A * | 1/1982 | Bianco | 5/2.1 |
| 4,646,371 A * | 3/1987 | Nowell | 5/200.1 |
| 4,867,598 A | 9/1989 | Winter | |
| 5,740,568 A | 4/1998 | Elliott | |
| 6,557,191 B2 | 5/2003 | Bellows | |
| 6,883,191 B2 | 4/2005 | Gaboury | |
| 6,948,198 B1 | 9/2005 | Eldersveld | |
| 7,793,367 B1 | 9/2010 | Ruiter | |
| 2005/0217027 A1 | 10/2005 | Polevoy | |
| 2010/0003077 A1 | 1/2010 | Kelley | |

FOREIGN PATENT DOCUMENTS

DE        3418463 A1 * 11/1985 ............. A47C 19/02

* cited by examiner

*Primary Examiner* — Robert G Santos
(74) *Attorney, Agent, or Firm* — Carrithers Law Office PLLC

(57) ABSTRACT

A bunk bed system including a head board and a foot board assembled with corner posts and interconnecting slats including a modified mortise and tenon joint which includes a dado on a lateral face of the tenon in alignment with a vertical post channel and longitudinal pin channel which lock and fixedly holding the joint together. The vertical channel member cooperatively engages the dado to both fixedly hold the tenon within the mortise and to also hold the tenon perpendicular to the mortise.

18 Claims, 4 Drawing Sheets

BUNK BED FRAME LOCKING SYSTEM

TECHNICAL FIELD

The present invention relates to the joining systems used to hold and secure a bunk bed frame together.

BACKGROUND OF THE INVENTION

Beds usually contain a head board and a mattress which is supported by either a box spring or a flat spring unit. A box spring is a large mattress-sized box containing wood and springs that provide additional support and suspension for the mattress. In some beds, the box spring is supported by slats held by side rails which are connected to the headboard and a foot board. Other beds contain no foot board or side rails but instead have a self supporting metal frame which may be connected to a head board if desired.

Still other beds, including most twin beds or bunk beds, contain a head board, a foot board, and a flat spring unit rather than a box spring.

The head board and foot board commonly contain two wooden posts with horizontal slats connecting the posts together. Often the term "headboard" refers to both the headboard and footboard, since they are identical or similar in dimension. Moreover the bunk beds can optionally be stacked one on top of another for form bunk beds and save space. It is also common to mount the headboards on extenders so that the bed will be elevated providing space beneath the bed for desks, trunks, and the like. The wooden headboards are usually fabricated from two posts and at least one crosspiece extending between the posts by doweling and gluing or by mortise and tenon joints. It is not uncommon with heavy use such as in dorms for the joints to become loose after a period of time.

The bed frames are usually fabricated from angle iron side rails and end rails welded together in a rectangle with one or more reinforcing members extending between the side rails. Springs and/or wires are typically strung between the rails to support a mattress thereon. The flat spring unit includes a peripheral frame and, typically, a support structure stretched inside the peripheral frame and supported by springs connecting the support structure to the rectangular peripheral frame. The support structure is often a wire mesh wherein wire members bent into links which cooperatively engage one another to form a two dimensional mattress supporting mesh. Other flat spring units may include springs stretched across a peripheral frame. A side rail mounting bracket is riveted or welded to each distal end of a side rail at each corner of the bed frame and adapted to include hooks which cooperatively engage and hang on pins which extend across the lateral face of a longitudinal U-shaped channel members disposed in a vertical channel or groove formed in each corner post of a headboard/footboard.

DESCRIPTION OF THE RELATED ART

U.S. Pat. No. 110,632 for BED FASTENER by Comins issued on Jan. 3, 1871 teaches a metal plate including lugs on one end and a concave construction at the opposite end. The lugs cooperatively engage one end of a bed rail and securely hold the plate to the end of the bed rail. The concave end of the plate is pushed into a vertical slot of the bed post whereupon a dowel is pushed into an aperture capturing the concave end of the plate, forming a tight joint between the bed rail and the bed post.

U.S. Pat. No. 6,948,198 for BED WITH UNITARY HEADBOARD AND UNITARY FRAME by Eldersveld issued on Sep. 27, 2005 teaches bed rails including two downward pointing hooks or lugs, one directly above the other which cooperatively engage two horizontal pins provided on one side of a bed post to securely fix the bed rail to the bed post.

U.S. Pat. No. 7,793,367 for FURNITURE POST AND COUPLER by Ruiter et al. issued on Sep. 14, 2010 teaches a modular post including slots for insertion of vertical rails including horizontal pins which cooperatively engage hooks or lugs on mating furniture parts for the purpose of secure assembly. The post can be combined, end to end, with another identical post when using an interlocking coupler, resulting in a new post which is twice as tall as the first post.

SUMMARY OF THE INVENTION

In accordance with the present invention, there is provided a bunk bed comprising, consisting of, and/or consisting essentially of a headboard and/or an opposing headboard/footboard, each one including a first post and a second post, the first post and the second post having at least two vertical sockets formed therein. At least one and preferably at least two horizontal slats each one having a tenon formed at each end for cooperative engagement with a corresponding vertical sockets within the first post and the second post capable of tightly receiving the tenons of the at least one and preferably at least two horizontal slats. The first post and the second post have vertical channels formed therein of a selected length aligned to face in a direction parallel to one another and in a direction perpendicular to the slats when the tenons of the slats are inserted into the first post and the second post. The sockets partially overlap a rear portion of the volume of the channels and extending into the posts a selected distance past the channels. The tenons have a vertical dado formed therein aligned with the channel when the tenons are fully inserted into the sockets. A generally U-shaped longitudinal pin channel having an elongated body is formed from a segment of extruded material is inserted into the vertical channel formed in the first post and the second post to cooperatively engage the dados within the tenons when the tenons are fully inserted into the sockets with the dados facing outwards into the vertical channels. The rear closed portion of the vertical pin channel members abut the dados and the open front portion or face of the pin channels have spaced apart horizontal pins extending between the side walls thereof capable of cooperatively engaging the vertical hooks extending from the end flanges of the bunk bed mattress supporting frame side rails.

It is an object of this invention to provide a bed with a head board and a foot board including improved mortise and tenon joints.

It is an object of this invention to provide a bed with a head board and a foot board with mortise and tenon joints wherein the tenons include a dado in the side of the tenon facing into the bed and near the free end of the tenon.

It is an object of this invention to provide a bed with a head board and a foot board wherein the dado near the end of the tenon receives a frame member which both fixedly holds the tenon within the mortise and forces the tenon to remain perpendicular within the mortise.

It is an object of this invention to provide a bed with a head board and a foot board with the improved mortise and tenon joints described above which can utilize glue and/or screws to more securely fasten the mortise and tenon joint.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
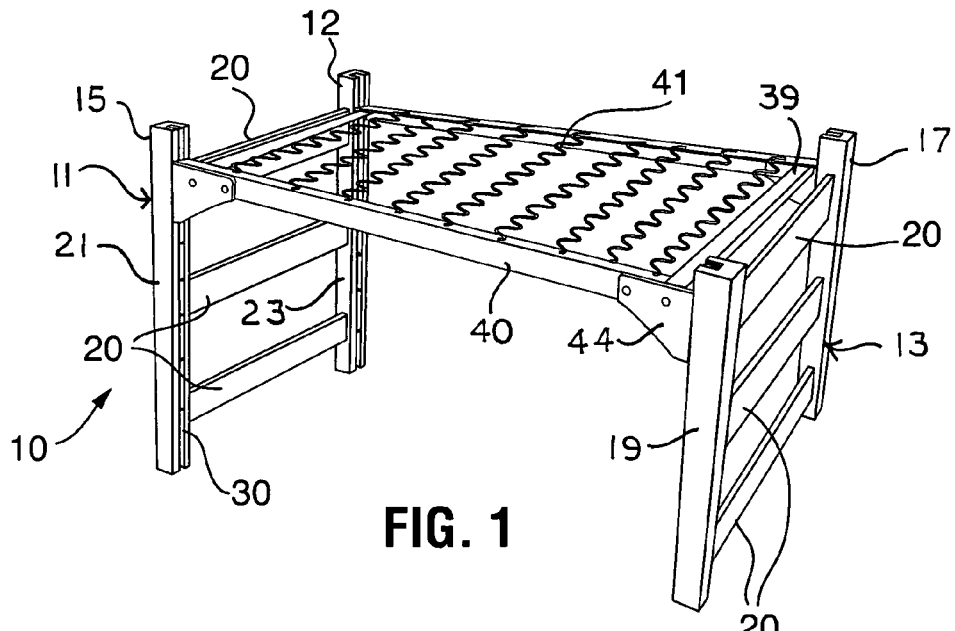
FIG. 1 is a corner view of a bunk bed with bed posts including vertical post channels with the post interconnected by a plurality of slats with a pair of side rails connecting the head board and foot board and a springs strung between the side rails for supporting a mattress thereon.

In one preferred embodiment as shown in FIGS. 1-9, the head board 11 and the foot board 13 are identical to one another in bunk bed 10. The head board 11 and foot board 13 each include a right corner post 15 and a left corner post 12 and connected by three slats 20. Each post is substantially square and includes an smooth rear surface 17, a smooth outside surface 19, an interior surface 21 having a longitudinal groove or channel 14 extending a selected length, depth, and width formed or cut therein with a means for cooperatively engaging a bed side rail, and an interior surface 23 including one or more slots 16 for cooperative engagement with one or more slats 20 extending between a pair of posts 12, 15. Means for mounting the bunk beds one on top of the other in a conventional manner is applicable to the present invention.

A spring unit, more particularly a flat spring unit, includes a rectangular peripheral frame 39 and a spring support structure 41 stretched across the peripheral frame 39. At each of the four corners, the peripheral frame 39 is attached to a side rail 40 which is attached to the post by a corner flange 44 extending from the distal end of each side rail 40. In a typical embodiment, each corner flange 44 includes two vertical hooks 42, one above the other which extend laterally past the end of the peripheral frame 39 for removable cooperative engagement with the retaining means disposed in the vertical post channels 14 of the corner posts 12, 15.

As shown in the figures, each one of the distal ends of the head board/foot board slat 20 is machined/milled/molded to a reduced width and height to form a tenon 26 and a dado 22 at a selected location defining a dado face 27 between dado shoulders 23, and forming a tenon slat shoulder 24 and a tenon distal end 25. The tenon distal end 25 is disposed within the slot 16 projecting beyond the vertical post channel 14 to abut the slot end wall 29. The face 27 of the dado 22 formed in the tenon 26 near the distal end faces the vertical post channel 14 and is aligned with and in cooperative engagement with the vertical post channel 14 and the pin channel 30 retained within the vertical post channel 14 by screws. The channel member 30 defines a longitudinal member having a generally U-shaped cross-section with an end wall 31 connecting side walls 32 with a plurality of pins 34 of a selected size and shape disposed between the side walls 32 spaced apart from the end wall 31 and each other at selected positions along the longitudinal member. After the tenon is placed within the socket 16 of the post, the channel member 30 is inserted into the vertical post channel 14 whereby the end wall 31 of the pin channel 30 rests against the face 27 of the dado 22 and the side walls 32 of the pin channel 30 rest against the dado shoulders 23. The tenon distal end 25 abuts the slot end wall 29 of the post and the tenon slat shoulder 24 abuts the surface 23 of the corner post for locking the slat 20 in position within the post and locking the tenon 26 within the slat slot 16 with the pin channel 30 providing a means for supporting the distal end projecting hooks 42 of the side rail flange 44, side rail 40 and 41 and spring frame 39 therebetween.

It is noted that the two corner flanges 44 at each end are parallel with one another and are configured so that the hooks 42 will slip into the open side of channel member 30 and cooperatively engage with the horizontal pins 34. The bunk bed is assembled by aligning the hooks 42 at one end of the side rail 40 supporting the flat spring unit 41 with the open side of the channel members 30 of the headboard 10 at a selected height and force the hooks down onto the selected pins 34. The hooks 42 extending from a bracket 44 at the opposite end of the side rail 40 can likewise be inserted into the pin channel member 30 of the footboard 10 preferably at the same height as in the headboard 10 and forced tightly onto the corresponding pins 34.

Figure 2:
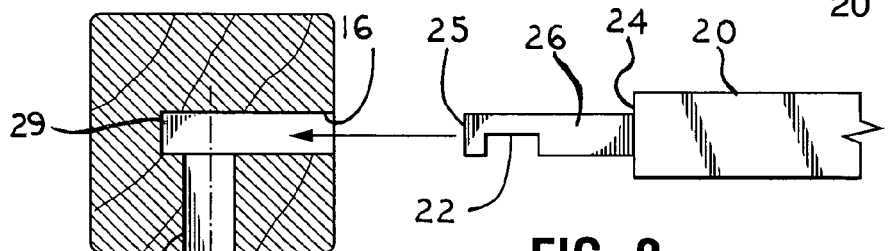
FIG. 2 is a perspective top view of a corner post showing placement of the slat tenon shoulder formed by the intersection of the distal end of the slat with the tenon for projection beyond the vertical post channel with a dado formed near the end of the tenon which aligns with and faces the vertical post channel which receives the pin channel retained by screws for locking engagement of the dado therein with the slat tenon shoulder abutting the surface of the corner post for holding the slat in position within respect to the post.
Figure 3:
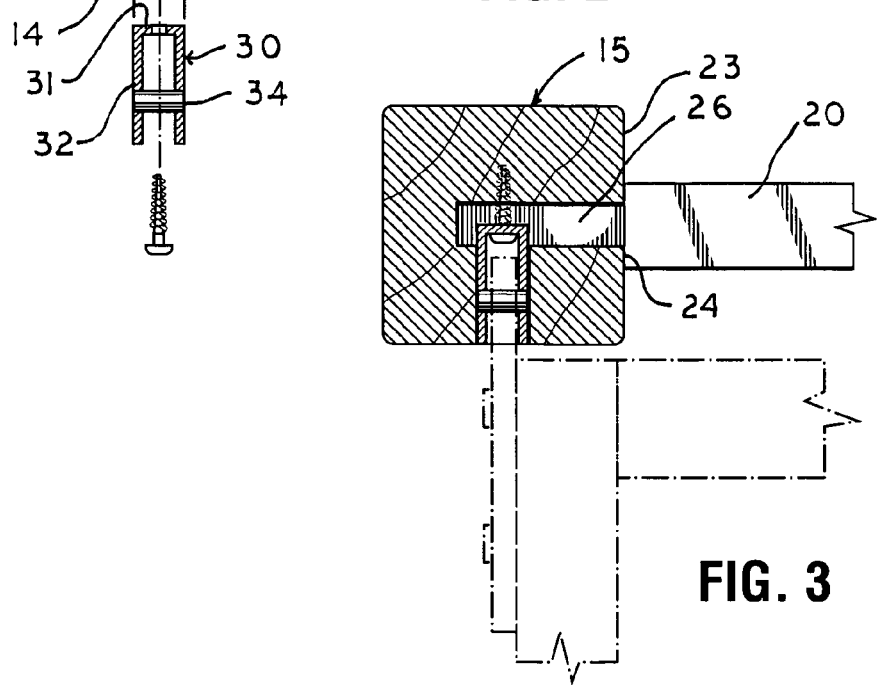
FIG. 3 is a perspective top view of the of the corner post of FIG. 2 showing the placement of the distal end of the head board slat including a tenon having a tenon end shoulder disposed within the slot projecting beyond the vertical post channel with a dado formed in the tenon near the distal end facing the vertical post channel and aligned with and in cooperative engagement with the vertical post channel and the pin channel retained within the vertical post channel by screws with the slat tenon shoulder abutting the surface of the corner post for locking the slat in position within the post and locking the tenon in the slat slot with the pin channel showing the distal end of the bed side rail and projecting hook in broken lines.
Figure 4:
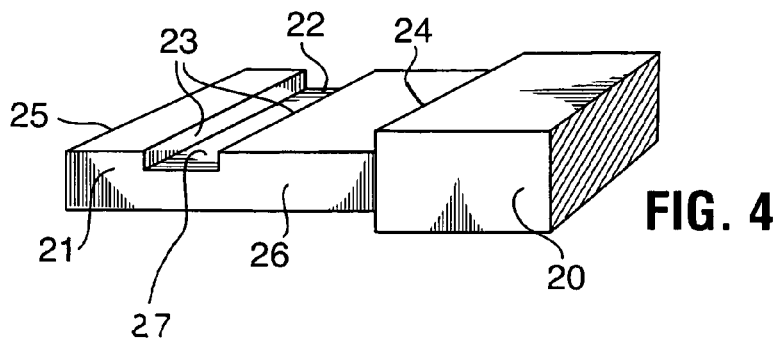
FIG. 4 is a perspective view of the distal end of a slat showing the tenon end shoulder, dado formed within the tenon, and slat tenon shoulder.
Figure 5:
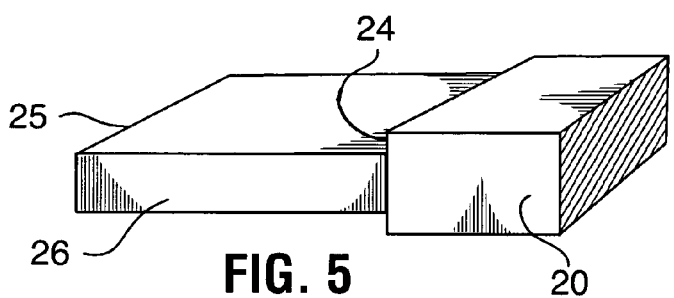
FIG. 5 is a perspective view of the distal end of a slat showing the tenon and tenon end shoulder.
Figure 6:
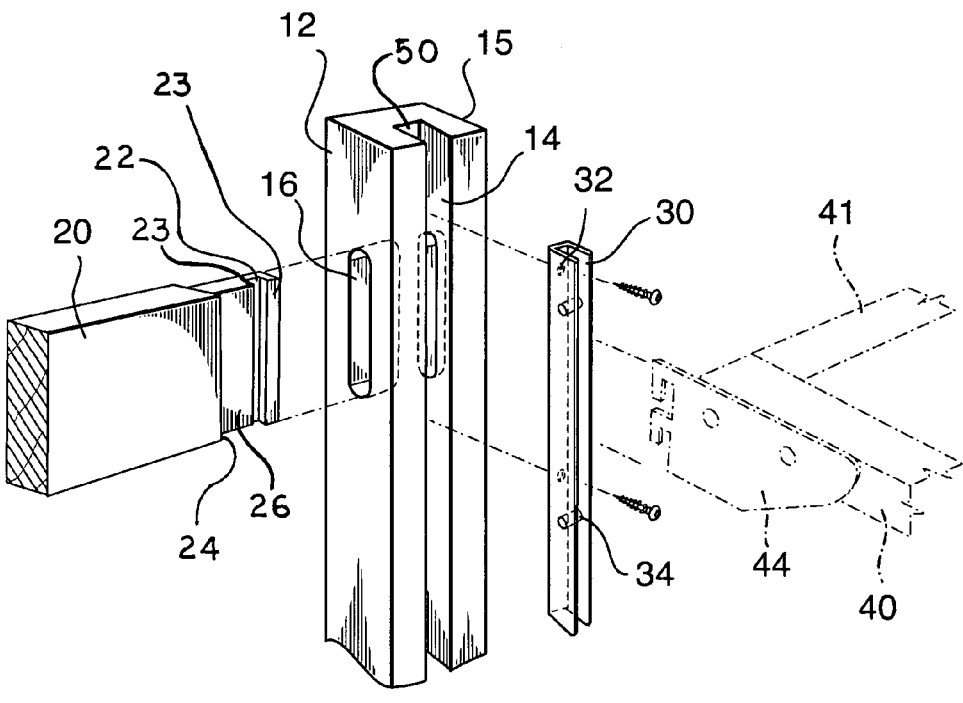
FIG. 6 is an exploded view showing a corner post having a interior slot and an exterior slot extending a selected distance beyond the vertical post channel terminating within the post, a slat showing placement of the slat tenon shoulder formed by the intersection of the distal end of the slat with the tenon for projection beyond the vertical post channel with a dado formed near the end of the tenon which aligns with and faces the vertical post channel which receives the pin channel retained by screws for locking engagement of the dado therein with the slat tenon shoulder abutting the surface of the corner post for holding the slat in position within respect to the post with the side rails and end flange having a hook shown in broken lines.
Figure 7:
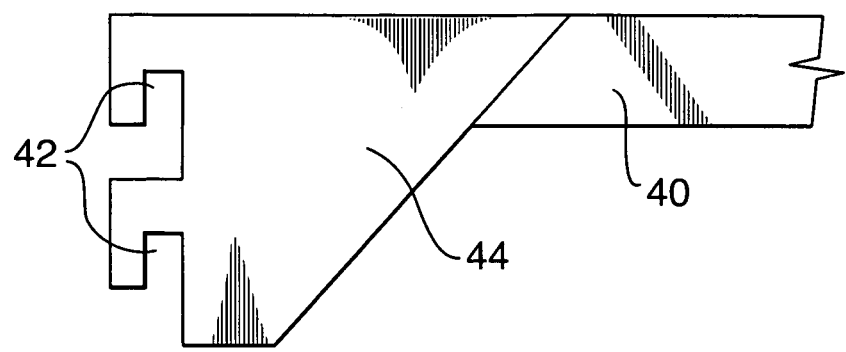
FIG. 7 is a perspective view of a distal end of a side rail showing the distal end flange having a pair of spaced apart hooks projecting therefrom for locking engagement with the pins in the longitudinal pin channel member.
Figure 8:
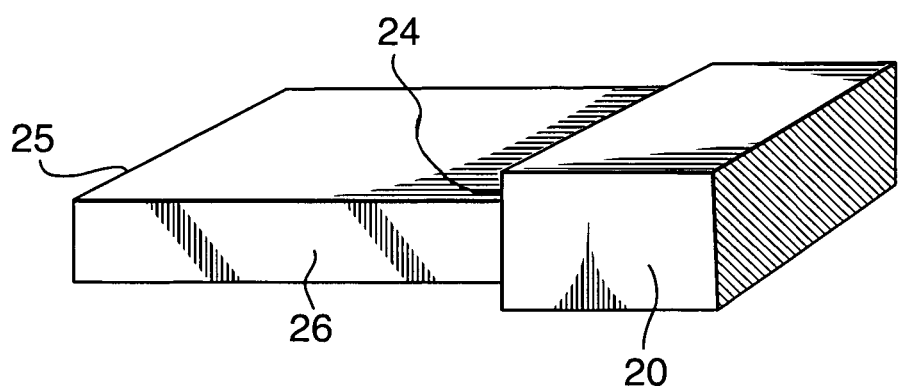
FIG. 8 is a perspective view of a distal end of a slat showing the tenon.

In a preferred embodiment, the sides of posts 12 and 15 which face each other have vertical slots 16 whereby each receive a tenon 26 formed on the distal end of each slat 20. As best illustrated in FIGS. 2, 3, and 6, the posts 12 and 15 each include a U-shaped vertical post channel 14 into which is fastened a vertical U-shaped channel member 30. The vertical channel member 30 includes horizontal pins 34 which cooperatively engage the vertical hooks 42 on the corner members 44 of the peripheral frame 40 of the flat spring unit, as shown in FIG. 7. The channel member 30 contains a plurality of spaced apart pins 34. The pins 34 are spaced apart to match the spacing between the hooks 42 of corner flanges 44. This allows the flat spring unit to be placed at any one of a number of vertical positions as determined by the placement of pins 34.

Figure 9:
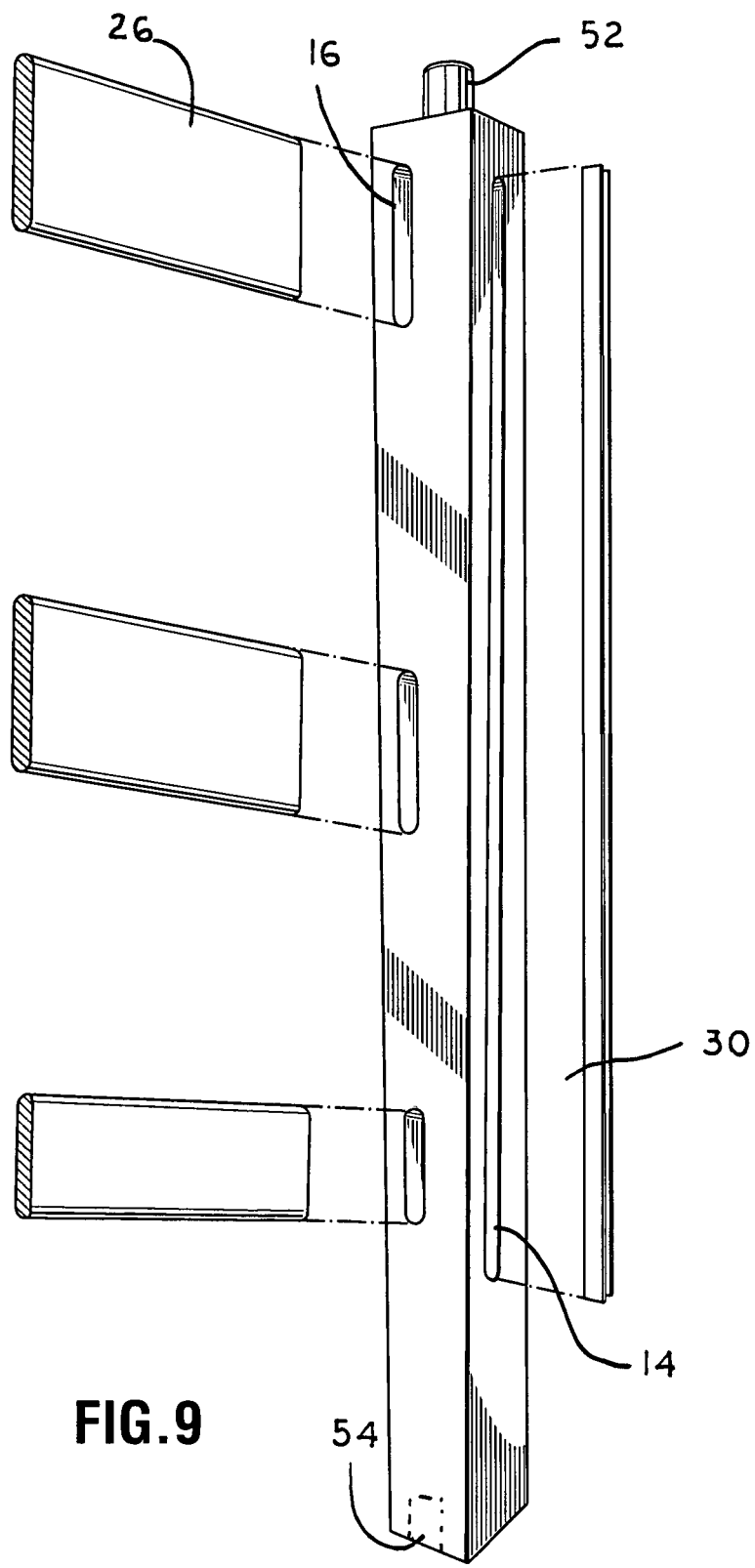
FIG. 9 is a perspective view showing a corner post having offset slots spaced apart and in alignment with one another for cooperative engagement with tenons extending from the distal ends of respective slats and showing a vertical post channel extending a selected distance toward each end of the corner post for receiving a longitudinal pin channel therein.

As best shown in FIGS. 2 and 3, the tenon 26 begins at the shoulder 24 and ends at the end edge 25 of slat 20. The tenons 26 at each end of slats 20 include a dado 22 which is parallel to the end edge 25 of slat 20. As seen in FIG. 9, the tenon 26 of slat 20 is pushed into socket 16 of post until the shoulder 24 is tight against the side 15 of the post, dado 22 comes into perfect alignment with the channel 14 in side 17 of the post. With the all three of the slats 20 so inserted into the sockets 16 of post 12, the channel member 30 is now inserted into the channel 14 with the open side of pin channel member 30 facing outwards. At this point, wood screws or other retaining means are inserted and driven into the holes formed in the end wall 31 of the pin channel member 30 and on into the end wall 50 of the vertical post channel 14 to fixedly secure the channel member 30 into the channel 14. With the channel member tightly secured in channel 14 and in the dados 22, the slats 20 are also securely held within the post. The channel member 30 is tightly held between the shoulders 23 of the dados 22 so that the slats 20 are tightly secured.

The opposite ends of the three slats 20 are likewise inserted into the facing sockets 16 of post 13 and, again, the dados 22 perfectly align with the channel 14 of post 13. Another channel member 30 is inserted and secured with wood screws to complete the headboard or footboard 10.

Thus, it can be seen that the corner post sockets 16 and the slat tenons 26 form a mortise joint which can be glued together. However, because the channel member fits tightly into the dados 22 of the tenons 26, no glue is required to hold the improved mortised joint together. The improved mortise joint can be easily disassembled, if desired, by removing the screws which retain the longitudinal pin channel member into the vertical post channel.

Depending upon the means of packaging and shipping the bunk beds, the headboard and/or footboard can be fabricated as a modular unit wherein the slats and posts are constructed as a unit and application of glue to the post and tenon joint further strengthens the joint and bunk bed frame structure.

As shown in FIG. 9, another preferred embodiment utilizes a corner post which includes a peg 52 on the top of the post and correspondingly sized and shaped socket 54 on the bottom of the post for mounting one bunk bed 10 upon another. The embodiment also shows that the vertical post channel 14 and pin channel 30 may be of a selected length or extend the entire length of the post. As shown the slots 16 within the post are offset a selected distance to provide maximum strength to the slat and slot arrangement. Moreover, in the embodiments discussed heretofore, the slots 16 did not extend all of the way through the post; however, it is contemplated that such an arrangement would be within the scope of the present invention.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A bunk bed headboard/footboard comprising:
   a first post and a second post, said first post and said second post having at least two vertical sockets formed therein;
   at least two horizontal slats, each of said slats having a tenon formed at each end;
   said vertical sockets within first post and said second post capable of tightly receiving said tenons of said at least two horizontal slats;
   said first post and said second post having vertical channels formed therein, said vertical channels aligned to face in a direction parallel to one another and in a direction perpendicular to said slats when said tenons of said slats are inserted into said first post and said second post;
   said sockets partially overlapping a rear portion of the volume of said channels and extending into said posts past said channels;
   said tenons having a vertical dado formed therein, said dado being perfectly aligned with said channel when said tenons are fully inserted into said sockets; and
   two U-shaped vertical channel members capable of being inserted into said vertical channels of said first post and said second post and cooperatively engaging said dados within said tenons when said tenons are fully inserted into said sockets with said dados facing outwards into said vertical channels, said vertical channel members having spaced apart horizontal pins capable of cooperatively engaging vertical hooks on flanges of a bunk bed mattress supporting frame.

2. The bunk bed headboard/footboard of claim 1, wherein a head board and a foot board assembly include corner posts and interconnecting slats including a modified mortise and tenon joint which includes a dado on said lateral face of the tenon in alignment with said vertical post channel and said vertical channel member which locks and fixedly holds said modified mortise and tenon joint together, and said vertical channel member cooperatively engages said dado to both fixedly hold said tenon within said modified mortise and tenon joint and hold said tenon perpendicular to said vertical post channel and said vertical channel member.

3. The bunk bed headboard/footboard of claim 1 including a bunk bed mattress supporting frame comprising flat spring unit.

4. The bunk bed headboard/footboard of claim 1 including a bunk bed mattress supporting frame comprising box spring.

5. The bunk bed headboard/footboard of claim 1 including at least one crosspiece extending between the posts by means of attachment selected from the group of consisting of dowels, glue, mortise and tenon joints, or combinations thereof.

6. The bunk bed headboard/footboard of claim 1, including a side rail mounting bracket fastened to each distal end of a side rail at each corner of a bed frame including hooks which cooperatively engage and hang on said plurality of pins extending across the lateral face of said pair of spaced apart opposed longitudinal U-shaped channel members disposed in said vertical channel formed in each corner post.

7. The bunk bed headboard/footboard of claim 1, wherein a slat tenon shoulder formed by the intersection of a distal end of said slat with said tenon projects beyond said vertical post channel and has said dado formed near the end of the tenon which aligns with and faces said vertical post channel receiving said channel members retained by screws for locking engagement of the dado therein with the slat tenon shoulder abutting the surface of the corner post for holding the slat in position within respect to the post.

8. The bunk bed headboard/footboard of claim 1, wherein said corner post includes offset slots spaced apart and in alignment with one another for cooperative engagement with tenons said extending from the distal ends of respective slats.

9. The bunk bed headboard/footboard of claim 1, wherein said channel member fits tightly into said dados of said tenons and no glue is required to hold the improved mortised joint together.

10. The bunk bed headboard/footboard of claim 1, wherein said channel member fits tightly into said dados of said tenons and screws are included to provide additional reinforcement for holding the improved mortised joint together whereby said channel members can be easily disassembled, if desired, by removing the screws which retain the longitudinal pin channel member into said vertical post channel.

11. The bunk bed headboard/footboard of claim 1, wherein a head board and a foot board are identical to one another and each one includes a right corner post and a left corner post connected by three slats, and said right corner post and said left corner post are substantially square and includes an smooth rear surface, a smooth outside surface, an interior surface having said vertical or channel extending a selected length, depth, and width formed or cut therein with a means for cooperatively engaging a bed side rail, an interior surface including one or more sockets for cooperative engagement with one or more slats extending between said right corner post and said left corner post.

12. The bunk bed headboard/footboard of claim 1, including means for mounting one bunk bed on top of a second bunk bed.

13. A bunk bed frame locking system, comprising:
a head board/foot board slat machined/milled/molded to a reduced width and height to form a tenon and a dado at a selected location defining a dado face between a pair of dado shoulders, and forming a tenon slat shoulder and a tenon distal end;
a tenon distal end disposed within a slot projecting beyond a vertical post channel formed in a post to abut a slot end wall formed in said post;
a face of said dado being formed in said tenon near a distal end facing said vertical post channel and aligned with and in cooperative engagement with said vertical post channel and a selected pin channel retained within said vertical post channel by fastening means;
a channel member defining said pin longitudinal having a generally U-shaped cross-section with an end wall connecting side walls with a plurality of pins of a selected size and shape disposed between said side walls spaced apart from said end wall and each other at selected positions along said longitudinal member;
said tenon is disposed within a said slot of said post;
said pin channel is inserted into said vertical post channel whereby said end wall of said pin channel rests against said face of said dado and said side walls of said pin channel and rest against said pair of dado shoulders;
said distal end of said tenon abuts said slot end wall of said post and said tenon slat shoulder abuts a surface of said post for locking said slat in position within said post and locks said tenon within said slat slot with said pin channel providing means for supporting a plurality of distal end projecting hooks of a side rail flange, a pair of opposing spaced apart side rails and a spring frame there between.

14. The bunk bed frame locking system of claim 13, wherein said flanges are parallel with one another and are configured so that said hooks slip into the open side of said pin channel member and cooperatively engage with the horizontal pins.

15. The bunk bed frame locking system of claim 14, wherein a bunk bed assembly includes said plurality of aligned hooks at one end of said side rail supporting a said spring said with the open side of said frame pin channel of said post at a selected height and forcing said plurality of hooks down onto selected pins and said plurality of hooks extending from a said flange at an opposite end of said side rail are likewise inserted into a selected pin channel of a footboard preferably at the same height as in a headboard and forceably tightened onto the corresponding pins.

16. The bunk bed frame locking system of claim 13 wherein sides of two posts face each other and have vertical slots for receiving said tenon 26 formed on the distal end of each slat.

17. The bunk bed frame locking system of claim 13 wherein said tenon begins at said shoulder and ends at said tenon distal end and said tenons at each end of said slats include said dado which is parallel to the tenon distal end, wherein said tenon of said slat is pushed into a said slot of said post until said shoulder is tight against a side of said post and said dado comes into perfect alignment with said pin channel in another side of said post.

18. The bunk bed frame locking system of claim 17 wherein said slats are inserted into said slots of said post and said the pin channel is inserted into said vertical post channel with said open side of said pin channel facing outwards wherein retaining means are inserted and driven into a plurality of holes formed in said end wall of said pin channel and on into an end wall of said vertical post channel to fixedly secure said pin channel member into said vertical post channel.

* * * * *